UNITED STATES PATENT OFFICE.

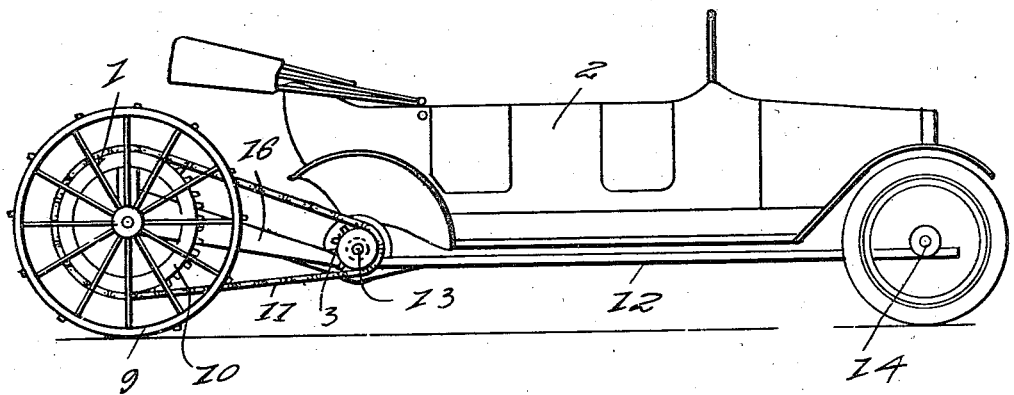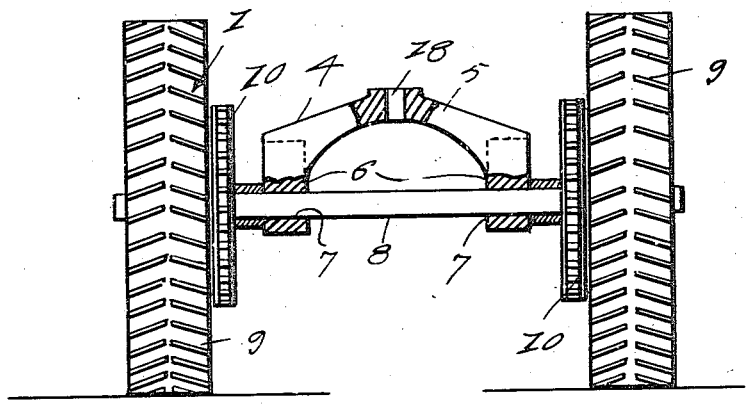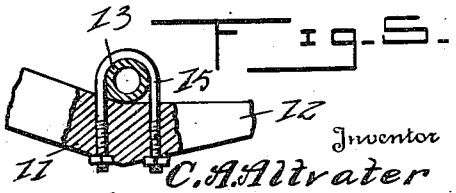

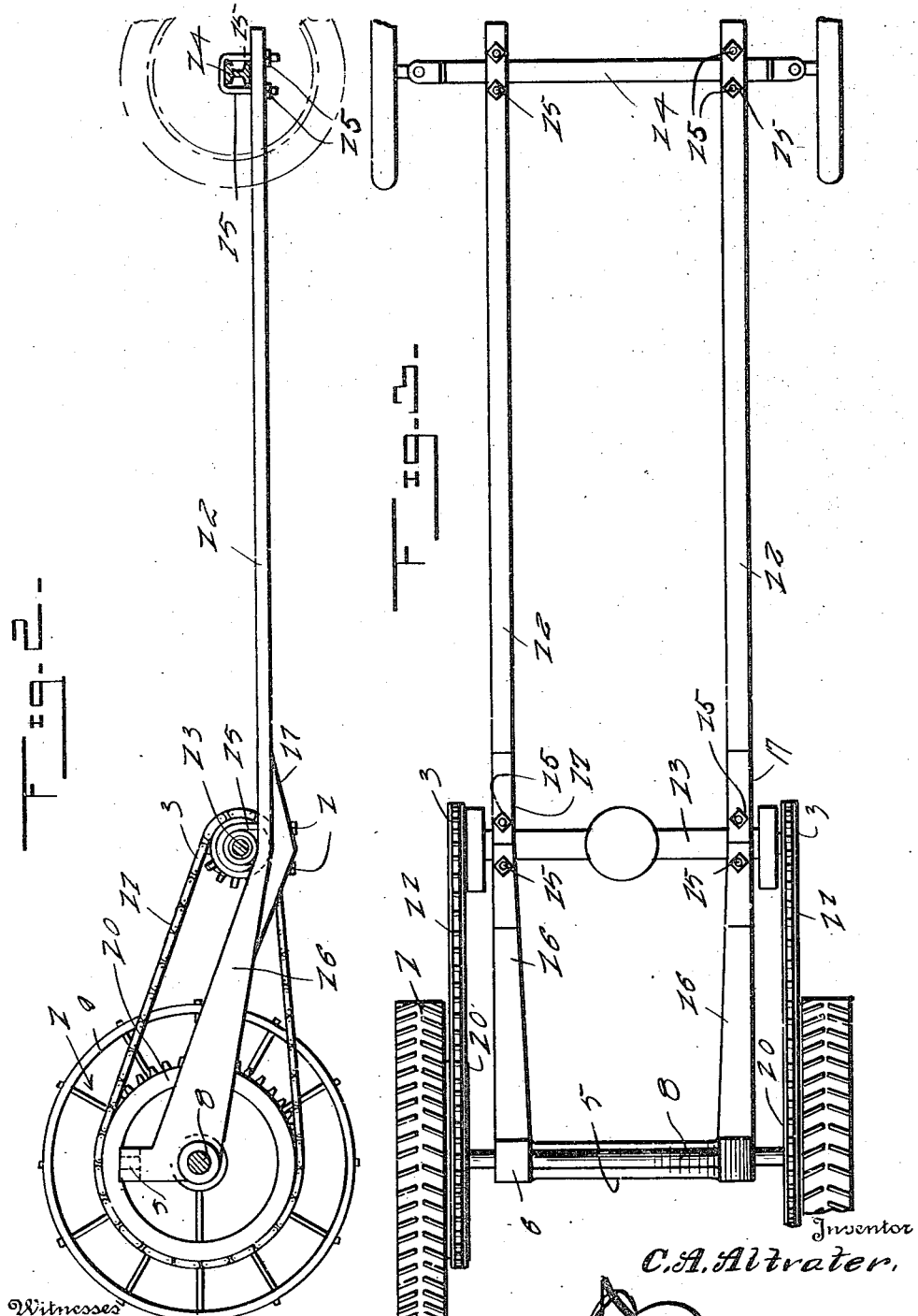
C. A. ALTVATER.
AUTOMOBILE TRACTION WHEEL ATTACHMENT.
APPLICATION FILED MAY 23, 1917.
1,268,417.
Patented June 4, 1918.
2 SHEETS—SHEET 2.

CLARENCE A. ALTVATER, OF OGDEN, ALBERTA, CANADA.

AUTOMOBILE TRACTION-WHEEL ATTACHMENT.

1,268,417.　　　　　Specification of Letters Patent.　　Patented June 4, 1918.

Application filed May 23, 1917. Serial No. 170,466.

*To all whom it may concern:*

Be it known that I, CLARENCE AUGUSTUS ALTVATER, a citizen of the United States, residing at Ogden, in the Province of Alberta and Dominion of Canada, have invented certain new and useful Improvements in Automobile Traction-Wheel Attachments; and I do hereby declare the following to be a full, clear, and exact description of the invention, such as will enable others skilled in the art to which it appertains to make and use the same.

This invention relates to tractors and more particularly to tractor attachments for the ordinary type of motor vehicles, and has for its primary object to provide means which may be attached to the ordinary type of vehicle, whereby the same can be used to draw plows, harrows, cultivators, mowers, reapers and other agricultural implements.

Another object of the invention is the provision of a tractor which can be readily attached or detached from the ordinary type of motor vehicle, so that the vehicle can be either used for power purposes or transportation purposes.

A further object is the provision of a tractor attachment which can be attached to a vehicle ordinarily used for transportation purposes by removing the rear wheels thereof and placing the tractor attachment in its place and which will leave all parts of the motor vehicle and of the power plant of the motor vehicle and all of its bearings in their normal position so that there will be no disturbance in the working parts and the lubricating system of the running gear.

A still further object of the invention is to provide a tractor attachment for the ordinary type of pleasure cars, which embodies a frame of unusual strength being so constructed as to have the parts subject to the most strain thoroughly reinforced and to have reinforcements arranged in such a manner as to provide a weight on the tractor wheels and thus increase the traction qualities thereof.

With these and other objects in view, the invention consists in the novel construction, arrangement and formation of parts as will be hereinafter specifically described, claimed and illustrated in the accompanying drawings, forming a part thereof, in which—

Figure 1 is a side elevation of the improved tractor attachment attached to a motor vehicle, Fig. 2 is a longitudinal sectional view through the improved tractor attachment attached to the vehicle, Fig. 3 is a bottom plan view of the tractor attachment attached to the vehicle, Fig. 4 is a rear elevation of the tractor attachment showing parts in section, and Fig. 5 is a detail fragmentary sectional view showing the method of attaching the tractor beams to the axles.

Referring to the drawings in detail, wherein similar reference numerals designate corresponding parts throughout the several views, the numeral 1 generically indicates the improved tractor attachment, which is attached to the vehicle 2 by removing the rear wheels thereof and putting in their place small sprocket wheels 3, which have the same length hub and similar interior structure that the removed wheels have, so that the sprockets can be substituted for the wheels whenever desired without materially changing the vehicle in any way. The improved tractor attachment 1 includes the frame 4 which has a curved yoke 5, the free ends 6 of which are thickened in width to reinforce the same and have registering apertures 7 formed therein which receive the axles 8. Traction wheels 9 are rotatably mounted on the ends of the axles 8 and have secured to the inner sides thereof large sprocket wheels 10, which receive sprocket chains 11 driven from the small sprocket wheels 3. Extending forwardly from the yoke 5 are tractor beams 12, which extend under the rear axle 13 and front axle 14 of the vehicle 2 and are secured thereto by U-bolts 15. The tractor wheels 9 are preferably larger in diameter than the wheels of the vehicle 2 and the tractor beams 12 have upwardly inclined portions 16 which extend from the rear axle 13 to the yoke 5. As the greater portion of the strain of the tractor occurs at this point, the upwardly inclined portions 16 are gradually increased in thickness toward the yoke 5 and the width of these portions is also increased. Ribs 17 are formed under the beams 12 where the rear axle 13 rests and form suitable reinforcing means for the beams at this point.

The inclined portions 16 of the tractor beams being thickened not only increase the strength of the structure at this point but also increase the weight on the tractor wheels 9 and thus increase the traction qualities thereof. Thus the thickened inclined portions 16 serve a two fold purpose.

The central portion of the yoke 5 is provided with a vertical aperture 18 by means of which plows, or other implements may be attached thereto.

In operation of the improved device, the car 2 may be ordinarily used for transportation purposes and when it is desired to use the same for power purposes the rear wheels are removed and the small sprocket gears substituted therefor and the beams 12 are bolted to the front and rear axles and the traction chain is placed over the large sprocket wheels on the tractor attachment and on the small sprocket wheels on the automobile. Thus it can be seen that the vehicle can be readily changed in a few minutes into a traction vehicle and can be readily changed back into the pleasure car.

The tractor attachment 1 can be used to the best of advantage as a front part of trailer or truck, so that the same can be used for hauling purposes by removing the iron cast tractor wheels 9 and substituting therefor the usual rubber tired trailer wheels (not shown.)

In practice, I have found that the form of my invention, illustrated in the accompanying drawings and referred to in the above description, as the preferred embodiment, is the most efficient and practical; yet realizing the conditions concurrent with the adoption of my device will necessarily vary, I desire to emphasize that various minor changes in details of construction, proportion and arrangement of parts may be resorted to, when required without sacrificing any of the advantages of my invention as set forth.

What is claimed is:—

A tractor attachment for motor vehicles comprising an inverted U-shaped yoke, the free ends of said yoke being thickened in width, an axle carried by the free ends of said yoke, tractor wheels mounted on said axle, forwardly projecting beams formed on said yoke, means connecting the beams with the motor vehicle, said beams being inclined upwardly from the rear end of the vehicle to said yoke, said inclined portions being gradually thickened in width and height to strengthen the same, the thickened portions of the yoke and frame also forming an additional weight on the traction wheels, and means operatively connecting the tractor wheels with the driving mechanism of a vehicle.

In testimony whereof I affix my signature in presence of two witnesses.

CLARENCE A. ALTVATER.

Witnesses:
JEAN PARKS,
THOMAS J. NOBLE.